Dec. 26, 1950
K. E. LYMAN
COMBINATION STEERING COLUMN SUPPORT
AND INSTRUMENT PANEL
2,535,744
Filed June 21, 1947
3 Sheets-Sheet 1
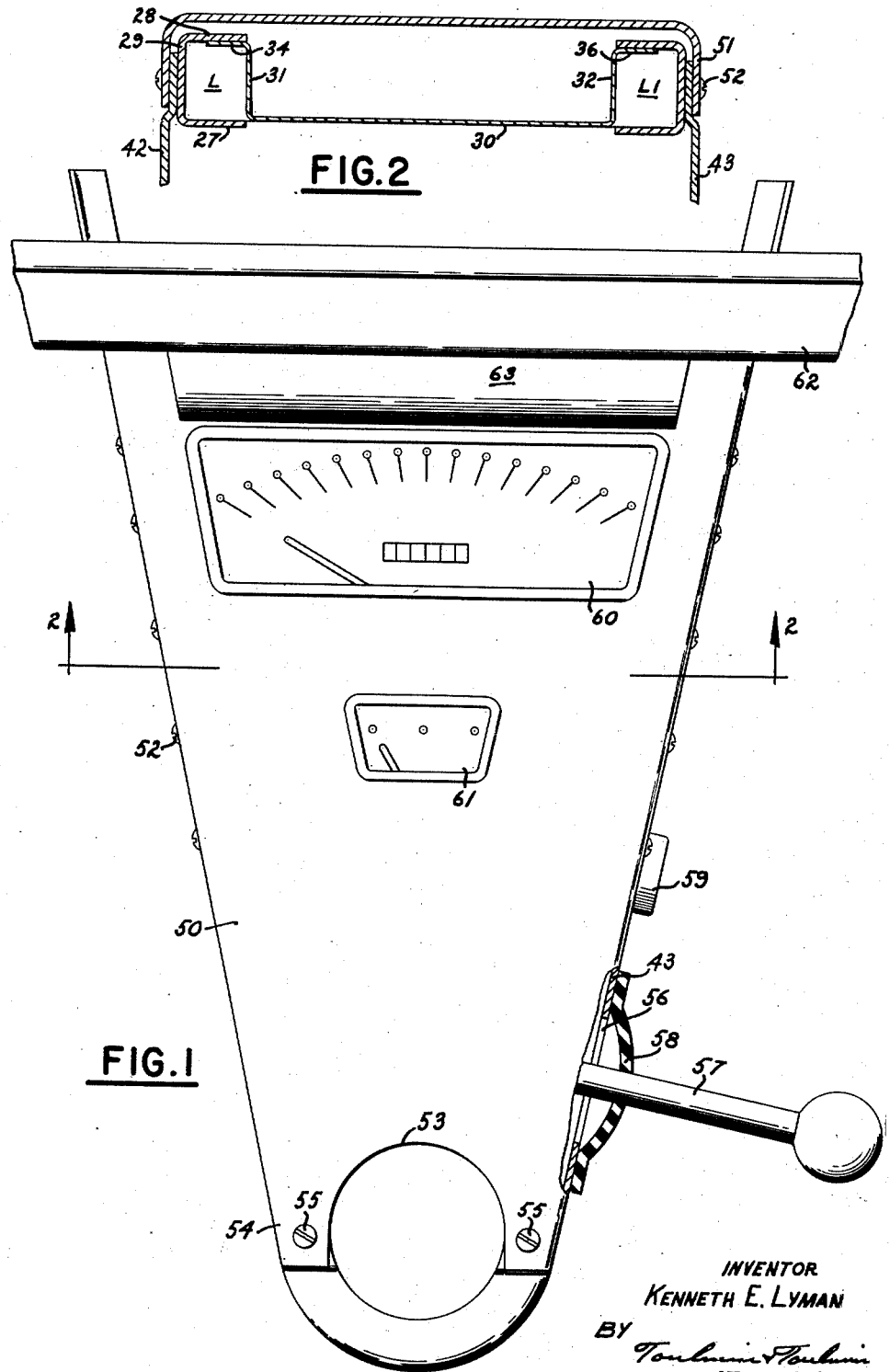
INVENTOR
KENNETH E. LYMAN
BY
*Toulmin & Toulmin*
ATTORNEYS

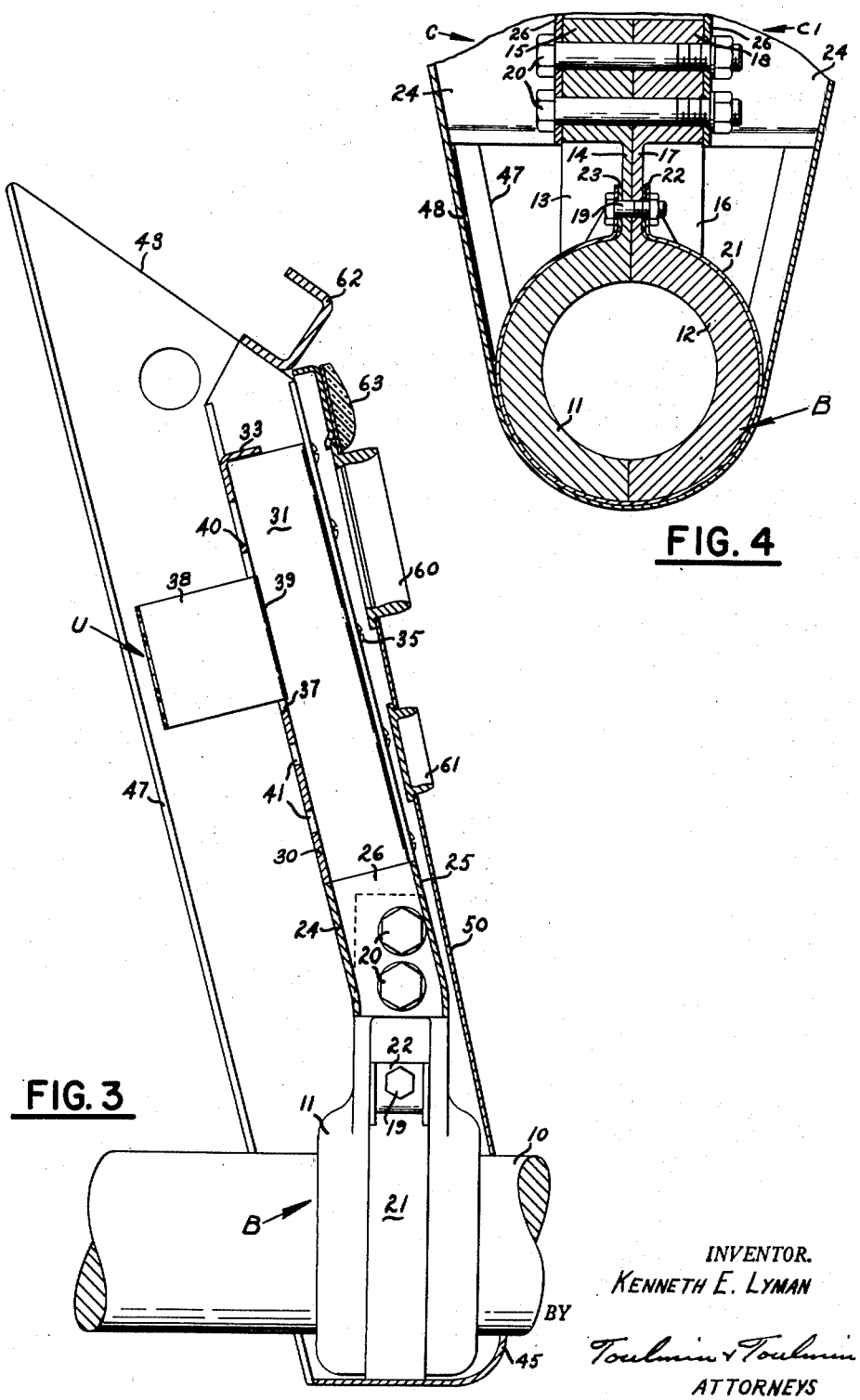

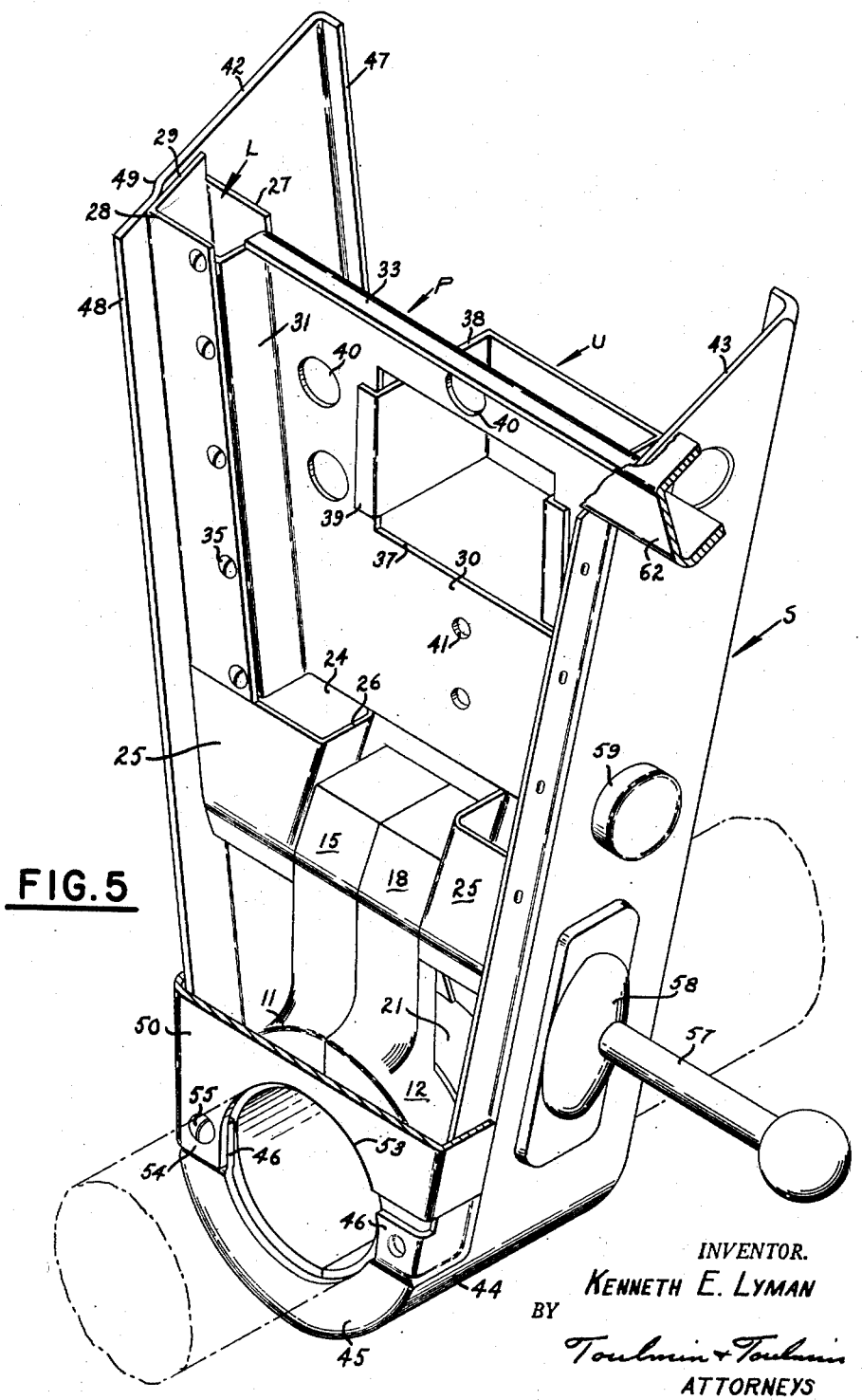

Patented Dec. 26, 1950

2,535,744

UNITED STATES PATENT OFFICE 2,535,744

COMBINATION STEERING COLUMN SUPPORT AND INSTRUMENT PANEL

Kenneth E. Lyman, Lake Forest, Ill., assignor to Tucker Corporation, Chicago, Ill., a corporation of Delaware Application June 21, 1947, Serial No. 756,234

6 Claims. (Cl. 180—78)

1

The present invention deals with automobiles and is concerned primarily with a structural part designed to function both as a steering column support and an instrument panel.

Every present day conventional automobile includes a steering wheel which is rotatably mounted on a steering column. Such a column must be adequately supported, and this support requires that a bearing be located an appreciable distance from the base.

Every automobile also includes a plurality of instruments, the gauge faces of which must be disposed in a position in which they may be readily viewed by the driver. It is highly desirable to locate these gauge faces in a position in which they can be seen with a minimum of distraction from driving operation.

With the foregoing conditions in mind, the present invention has in view as its foremost objective the provision, in an automobile, of a structural element which is designed to perform the functions of both an instrument panel and a steering column support.

In carrying out the above noted idea in a practical embodiment, a bearing is provided which receives the steering column. This bearing is supported from the structure immediately beneath the dashboard by a structural assembly which is also designed to carry the various gauge faces of the instruments.

Various other more detailed objects and advantages of the invention such as arise in connection with carrying out the above noted ideas in a practical embodiment will in part become apparent and in part be hereinafter stated as the description of the invention proceeds.

The invention, therefore, comprises a combination instrument panel and steering column support which consists essentially of a bearing for the steering column that is supported from the car construction by a structural assembly which also carries the gauge faces of instruments and other operating instrumentalities of the car.

For a full and more complete understanding of the invention, reference may be had to the following description and accompanying drawings, wherein:

Figure 1 is a top plan view of a combination steering column support and instrument panel designed in accordance with the precepts of this invention. In this view certain parts are broken away and shown in detail to more clearly bring out details of construction;

Figure 2 is a transverse section taken about on the plane represented by the line 2—2 of Figure 1;

Figure 3 is a longitudinal section taken normal to the showing of Figure 2;

Figure 4 is an enlarged detailed sectional showing through the steering column bearing and parts immediately associated therewith; and Figure 5 is a detailed perspective with the face panel removed.

Referring now to the drawings wherein like reference characters denote corresponding parts, and first more particularly to Figure 3, the portion of a steering column is therein depicted and identified by the reference character 10. A bearing, referred to in its entirety by the reference character B, is of a split, two-part construction and encloses the column 10.

Upon referring to Figure 4 it will be noted that the bearing B comprises the complemental halves 11 and 12. A recessed or channel-shaped lug 13 is integrally joined to the bearing half 11 and includes a bottom wall 14. This channel structure is integrally joined with a solid block 15. Likewise, the bearing half 12 is formed with a recessed or channel lug 16 having a bottom wall 17, and which structure is integrally connected with a block 18.

It will be noted that the bottoms 14 and 17 have faces which abut in meeting engagement and which are continued through the blocks 15 and 18 and also the bearing structure proper. A bolt and nut assembly designated 19 passes through aligned openings in the walls 14 and 17. Likewise, headed bolts and nuts 20 pass through aligned openings in the blocks 15 and 18.

In order to securely hold the bearing halves 11 and 12 in assembled relation, a retaining strap 21, which preferably is of metal, passes therearound and terminates in ears 22. These ears 22 are spaced from the walls 14 and 17 respectively by washers 23, and the headed bolt and nut 19 also passes through these washers and openings in the ears 22 to securely clamp the strap 21 about the bearing halves.

A channel shaped member, identified in its entirety by the reference character C, comprises a rear wall 24, a front wall 25, and a bottom wall 26 which engages the face of the block 15 opposite to the face which engages the block 18. Similarly, a second channel member C₁ has a rear wall 24, a front wall 25, and a bottom wall 26 that engages a face of the block 18. These bottom walls of the channel members C and C₁ are securely anchored to the blocks 15 and 18 by the nut and bolt assemblies 20.

A beam of channel construction is referred to in its entirety by the reference character L, and comprises a rear wall 27, a front wall 28, and an outer or side wall 29 (see Figures 2 and 5). The lower end of this beam L is anchored to the channel member by butt welding the ends of the rear wall 27 of the beam L to the rear wall 24 of the channel member C, and the front wall 28 of the beam L to the front wall 25 of the channel member C.

A second beam $L_1$ is located at the opposite side of the structure and includes rear, front, and outer walls corresponding to the walls 27, 28, and 29, with the rear and front walls butt welded to the rear and front walls of the channel member $C_1$.

A backing plate is referred to in its entirety by the reference character P. This plate P consists of a back panel 30, a side wall 31, a second side wall 32, and an upper end flange 33. The front or free edge of the side wall 31 is turned over to provide a flange 34 which engages the under face of the front wall 28 of the beam L. This flange 34 is secured to the front wall 28 of the beam L by a screw fastener shown at 35. Likewise, the front free edge of the wall 32 is formed with a flange 36 which engages the under face of the front wall 28 of the beam $L_1$, and is secured thereto by screw fasteners 35.

The panel 30 of the backing plate P is formed with a large rectangular recess 37, and fitted in this recess is a U-shaped bracket U, which is designed to receive the meter box (not illustrated) of the speedometer. The bracket U has legs 38, the free edges of which are turned over to form flanges 39 that engage the front face of the panel 30. This panel 30 is also formed with openings 40 and smaller openings 41 which accommodate electric wiring and cables which extend to the gauges which are carried thereon.

An outer casing or shroud is referred to in its entirety by the reference character S. This shroud is generally of U-shaped formation and consists of side walls 42 and 43, which are in non-parallel relation, converging together at a bend portion 44. This bend portion 44 snugly engages and partially encloses the strap 21 which holds the bearing halves 11 and 12 together. The bend portion 44 carries a front wall 45 of arcuate formation which is integrally joined therewith, and which lies over the front face of the bearing B. This front wall 45 carries a pair of depressed tabs 46 for a purpose to be later described.

Each of the side walls 42 and 43 includes a rear flange 47 and a front or top portion 48 that is inwardly offset with respect to the main portion of the walls. This offset construction at 48 defines a shoulder 49 at each of the walls 42 and 43.

A front panel is designated 50 and has a shape generally conforming to the shape of the casing or shroud S. This front panel 50 is formed at each side with a depending flange 51 that overlies and engages the inwardly offset portion 48 of the respective side wall of the casing S. A series of screw fasteners shown at 52 serves to secure the side flanges 51 to the offset portions 48 of the side walls of the casing S.

The lower end of the panel 50 is formed with a semi-circular recess 53 which receives the steering column 10. The presence of this recess defines ears 54 which overlie the tabs 46. Screw fasteners 55 join the ears 54 to the tabs 46.

As shown in Figure 1, the side wall 43 of the casing S may be formed with an opening 56 which is designed to accommodate a gear shift lever 57. A flexible diaphragm 58 may be employed in mounting the gear shift lever. It is notable that the wall 43 also may carry a lock of an ignition system which is represented at 59.

It is not deemed necessary to here enter into a detailed description of the various instruments and devices which are necessary to the operation of an automobile that may be accommodated by the above described structural assembly. As shown in Figure 1, the panel 50 may be provided with a large window at 60 which could either accommodate a speedometer as illustrated, or a speedometer in combination with other gauge faces. Likewise, while an oil pressure gauge is shown at 61, various other instruments could be accommodated. It is also contemplated that the side wall 42 of the casing S could function as a mounting for accommodating such devices as turn signal switches, heater controls, etc.

Upon referring more particularly to Figures 1 and 2, it will be noted that a channel-shaped structural element 62 extends across the casing S above the front panel 50. This structural element is designed to anchor to the upper end of the assembly to a dashboard or comparable part of an automobile body. A decorative bead shown at 63 extends above the openings 60 and is provided for the purpose of improving the appearance effects.

It is evident that the above described structure provides adequate support for the bearing B which receives the steering column, and also is suitably adapted for receiving various instruments and instrumentalities involved in the operation of a motor vehicle. All of these are located at a position in which they may be readily viewed by the driver of the car with a minimum of distraction from the driving operation.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. A combination steering column support and instrument panel comprising a two-part bearing, a pair of channel members secured to said bearing on opposite sides thereof, a pair of side beams joined to said channel members, a backing plate secured to said side beams, a U-shaped casing enclosing said bearing and side beams, and a front panel carried by said casing.

2. A combination steering column support and instrument panel comprising a two-part bearing consisting of complemental halves having lugs thereon formed to abut, a pair of channel shaped members on either side of said lugs, means for clamping said channel shaped members to said lugs and the lugs together, a pair of channel shaped side beams connected to said channel shaped members, a backing plate having side walls connected to said side beams, a U-shaped casing having a bend portion enclosing said bearing and side walls overlying said side beams, and a front panel detachably connected to said casing.

3. A combination steering column support and instrument panel comprising a split bearing having lugs thereon formed to abut, a strap circling said bearing for maintaining it in assembled position and formed with ears, clamping means securing said ears to said lugs and said lugs together, a pair of side beams in diverging relation, connecting members joining said side beams to said lugs, a depressed backing plate connected to said side beams, a U-shaped casing enclosing said bearing and side beams, and a front panel detachably secured to said casing.

4. A combination steering column support and instrument panel comprising a bearing, a pair of side beams in diverging relation, connecting members joining said side beams to said bearing, a U-shaped casing having a bend portion enclosing said bearing and side walls overlying said side beams, and a front panel detachably secured to said casing.

5. A combination steering column support and instrument panel comprising a bearing, a pair of side beams in diverging relation, connecting members joining said side beams to said bearing, a U-shaped casing having a bend portion enclosing said bearing and side walls formed with inwardly offset front portions at the top, and a front panel having side flanges detachably secured to said inwardly offset portions of said casing.

6. A combination steering column support and instrument panel comprising a circular bearing, a pair of side beams in diverging relation, connecting members attaching said side beams to said bearing, a U-shaped casing having side walls in diverging relation corresponding to the diverging relation of said side beams, and a bend portion enclosing said bearing, said casing also being formed with an arcuate front wall integral with said bend portion and overlying the front of said bearing, and a front panel having side flanges detachably secured to said side walls of the casing and ears detachably secured to the arcuate front wall of said casing.

KENNETH E. LYMAN.

REFERENCES CITED

The following references are of record in the file of this patent:

UNITED STATES PATENTS

| Number | Name | Date |
| --- | --- | --- |
| 1,161,389 | Joy | Nov. 23, 1915 |
| 1,485,922 | Higgins | Mar. 4, 1924 |
| 1,524,127 | Gordon | Jan. 27, 1925 |
| 1,782,405 | Boyce | Nov. 25, 1930 |
| 1,802,278 | Schlaich | Apr. 21, 1931 |

FOREIGN PATENTS

| Number | Country | Date |
| --- | --- | --- |
| 154,557 | Great Britain | Apr. 28, 1921 |